Dec. 25, 1962  H. W. WILSON ET AL  3,070,357
POWDER BLENDING APPARATUS
Filed March 24, 1960  2 Sheets-Sheet 1
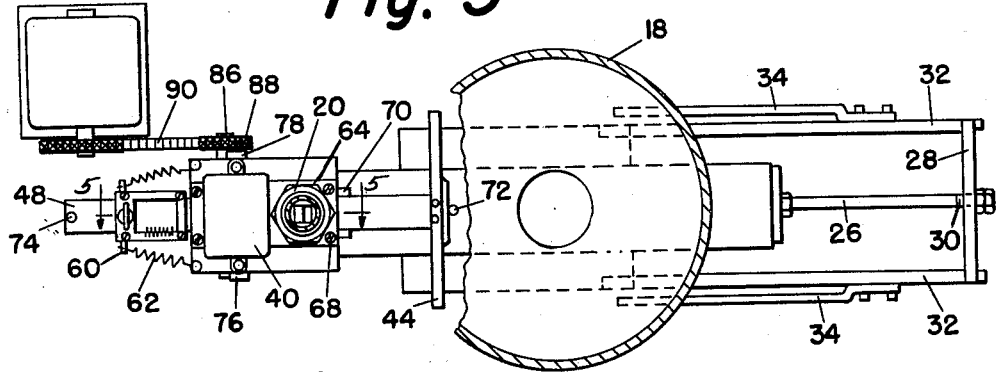
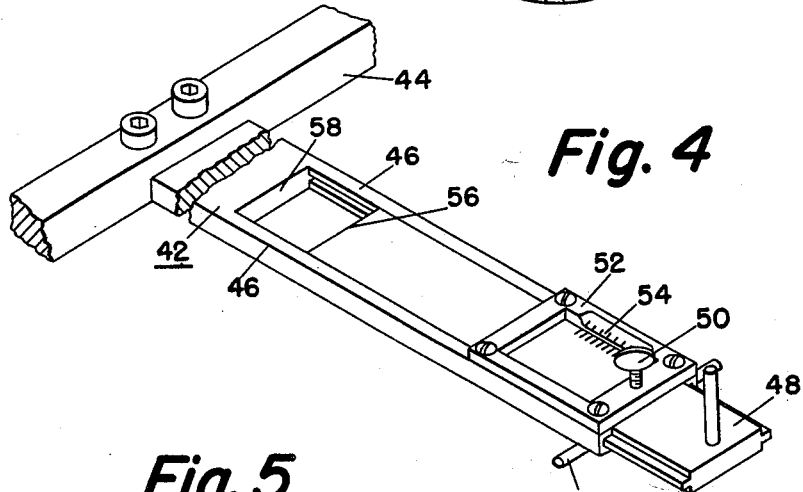
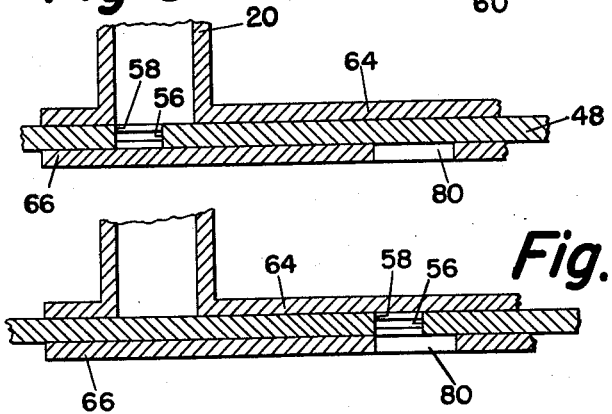
INVENTORS
HARRY W. WILSON
LEON LAUTIN
BY Arthur H. Seidel
ATTORNEY

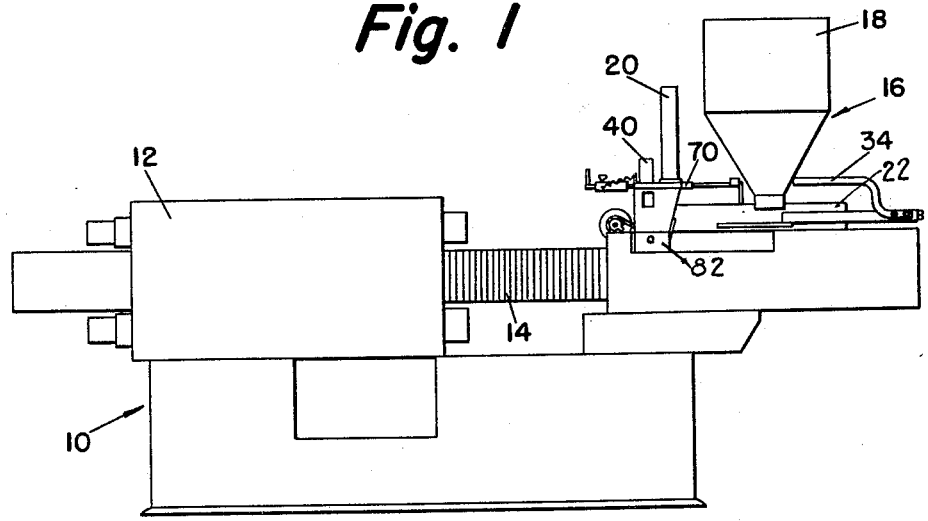
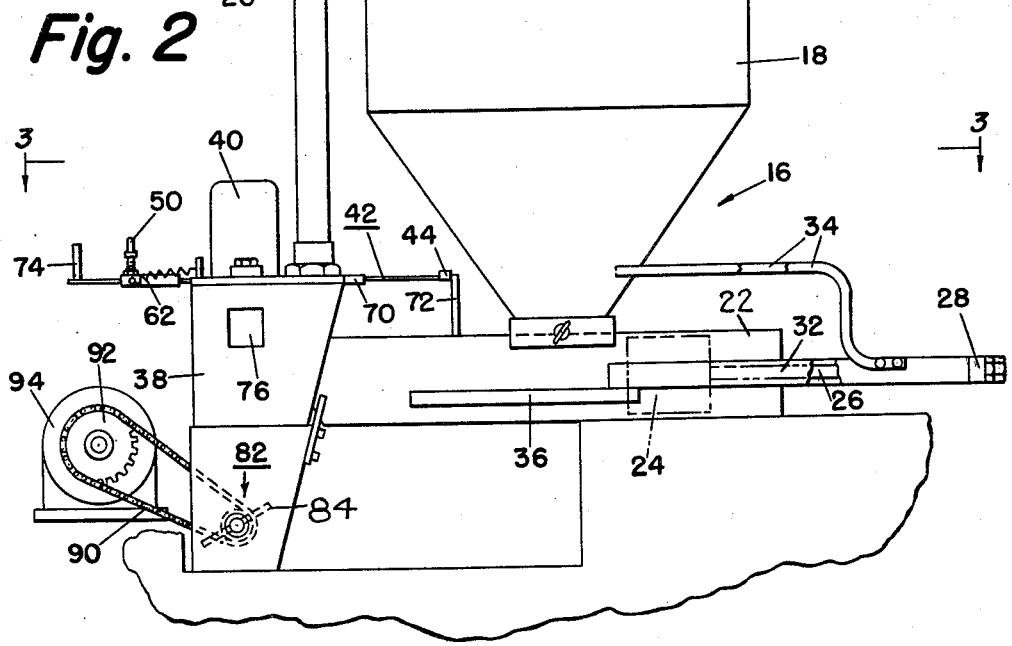

United States Patent Office 3,070,357
Patented Dec. 25, 1962

3,070,357
POWDER BLENDING APPARATUS
Harry W. Wilson, Garden City, and Leon Lautin, Cedarhurst, N.Y., assignors to Wilson Mold & Die Corporation, Mineola, N.Y., a corporation of New York
Filed Mar. 24, 1960, Ser. No. 17,408
5 Claims. (Cl. 259—25)

The present invention is directed to powder blending apparatus, and more particularly to powder blending apparatus which enables a plurality of powders to be selectively blended in closely controlled ratios just prior to being charged to an injection molding machine, extruder, or the like.

There has been a long felt need for apparatus which will enable the accurate blending of the various powder components making up the charge to injection molding machines, extruders, and like equipment. Thus, at the present time it is the standard practice among injection molders to blend the pigment with the powder charge prior to introducing the same into the injection molding unit. This leads to difficulties since it is necessary that precise blending be first achieved, as variations in the ratio of pigment to plastic monomer cannot be made once the blend is charged to the injection molding unit. Since it may be desirable to vary the ratio of pigment to plastic monomer after the injection molding unit has been put in operation, this inadequacy of existing injection molding equipment is a serious one.

Similar problems are present with existing extrusion equipment and with a wide variety of other forms of apparatus involving the kneading and/or compression and/or other processing of dry powder blends.

This invention has as an object the provision of novel powder blending apparatus.

This invention has as another object the provision of powder blending apparatus which may be used in direct conjunction with equipment for processing dry powder blends, such as injection molding equipment, extrusion equipment, and the like.

This invention has as another object the provision of powder blending apparatus which achieves precise regulation of the ratio between different powders which are being blended.

This invention has as still another object the provision of powder blending apparatus in which closely regulated control of the extent of pigment being blended into a powder mixture is achieved, such apparatus automatically stopping when due to malfunction the correct quantity of pigment is not being introduced into the powder blend.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevational view of the powder blending apparatus of the present invention incorporated into an injection molding machine.

FIGURE 2 is a fragmentary elevational view, with parts cut away, of the powder blending apparatus of the present invention.

FIGURE 3 is a plan view taken on line 3—3 of FIGURE 2.

FIGURE 4 is a fragmentary perspective view of the powder charger of the powder blending apparatus of the present invention.

FIGURE 5 is a longitudinal sectional view of the powder charger taken along line 5—5 in FIGURE 3 of the powder blending apparatus of the present invention with such powder charger being shown in its pigment receiving disposition.

FIGURE 6 is a longitudinal sectional view similar to FIGURE 5 except that the powder charger is shown in its pigment discharging disposition.

Referring to the drawings and initially to FIGURES 1, 2 and 3, the powder blending apparatus of the present invention is shown incorporated in FIGURE 1 on an injection molding machine designated generally as 10. The injection molding machine shown in FIGURE 1, except for those changes specifically set forth below, is a conventional unit, the type being illustrated being the Impco model HB 12–300, manufactured by Improved Machinery Inc. of Nashua, New Hampshire. The machine's platens are disposed at the clamping mechanism portion 12 of the machine. Such platens are fed heated moldable material by the heating cylinder 14 within which is the injection ram.

The powder blending apparatus of the present invention, which is designated generally as 16, discharges its powder blend into the heating cylinder 14, as will be explained below:

The powder blending apparatus 16 of the present invention comprises the monomer hopper 18. The plastic powder, such as monomer, to be charged to the heating cylinder 14 is fed into the monomer hopper 18.

The pigment to be blended with the powder from monomer hopper 18 is received within the pigment hopper 20. Since the percentage of pigment to plastic monomer will generally be very small, the relative size of the pigment hopper 20 to the monomer hopper 18 need not be very great. In fact, for most commercial ratios, where the monomer hopper 18 is of conventional size (such as having a capacity of about 110 pounds of monomer for a unit having a processing capacity of about 120 pounds per hour), the pigment hopper 20 may comprise a standpipe, as shown in the drawings.

The monomer hopper 18 discharges into the feeding cylinder 22. Thus, the piston 24 within the feeding cylinder 22 advances a given charge from the monomer hopper 18 at each of its strokes. As long as the monomer hopper 18 contains monomer, the rate of discharge of monomer therefrom may be closely regulated by regulating the length of the stroke of the piston 24 within the feeding cylinder 22.

The piston rod 26 projects outwardly from the piston 24 beyond the outer end of the feeding cylinder 22. The piston rod 26 carries the cross-head 28 on its free end portion, such free end portion of the piston rod 26 being threaded, as at 30, with such threaded end portion being threadably engaged with the cross-head 28.

The cross-head 28 carries forwardly projecting arms 32 and 32, which in turn carry offsets 34 and 34. FIGURES 2 and 3 will reveal that these offsets 34 and 34 extend appreciably above the arms 32 and 32, and are parallel in respect to each other. As seen from FIGURE 3, the offsets 34 and 34 straddle the inverted conical portion which makes up the bottom of the monomer hopper 18. Supports 36 may be provided on the housing of the feeding cylinder 22 for supporting the arms 32 during their reciprocation.

The feeding cylinder 22 discharges into the chute 38. The pigment hopper 20 is carried above the chute 38 and discharges into the chute 38 in the manner set forth below.

A vibrator, such as the mechanical vibrator 40, is provided on top of chute 38 and ensures the uninterrupted flow of powder into and through the chute 38.

The discharge of pigment from the pigment hopper 20 into the chute 38 is accomplished through the mechanism shown particularly in FIGURES 4, 5, and 6. Such mechanism includes the T, which is designated generally as 42.

The T 42 includes the head 44, which is operatively disposed adjacent the monomer hopper 18 in juxtaposition to the free ends of the offsets 34. Thus, as can be seen from FIGURE 2, upon the forward movement of the offsets 34 during the stroke of the piston 24, the head 44 of T 42 is struck by the free ends of the offsets 34 and moved thereby away from the monomer hopper 18.

The body of the T 42 is cut away for an appreciable portion at its end opposite to the head 44, to provide the mirror-image limbs 46 and 46. The juxtaposed inner faces of the limbs 46 and 46 are slotted with aligned grooves, and the slide 48, which has tongues at each of its sides, is slidably carried by the limbs 46. The thumbscrew 50 is carried above the slide 48 on the flange 52, which is bolted to the top faces of the limbs 46 and 46. The slide 48 may be secured in any relative disposition in respect to the limbs 46 and 46 by tightening the thumbscrew 50 thereagainst. Matching indicia 54 may be provided on the flange 52 and the uppermost face of the slide 48 for regulating the distance intermediate the inner end face 56 of slide 48 and the juxtaposed end face 58 of T 42. As will be more fully explained below, the distance intermediate the end faces 56 and 58 determines the amount of pigment delivered from pigment hopper 20 which is to be blended with the monomer from monomer hopper 18.

A crosspiece 60 is secured to the underside of the limbs 46 and 46 of T 42 near their outermost free ends. The crosspiece 60 serves as a seat to which the tension springs 62 are seated.

The bottom of pigment hopper 20 is flanged to provide a flange foot 64. The flange foot 64 rests on the top 66 of chute 38, and is bolted thereto, as by bolts 68. A set of tracks 70 for guiding the body of the T 42 including its limbs 46 and 46 is sandwiched intermediate the flange foot 64 of pigment hopper 20 and the top 66 of chute 38. The tracks 70 permit the body of the T 42 to reciprocate within the limits set forth below.

A stop 72 secured to the top of the housing of feeding cylinder 22 is provided to limit the movement of the T 42 towards the monomer hopper 18.

The springs 62 are anchored to the top 66 of chute 38. Since, as above indicated, the other ends of the springs 62 are anchored to the crosspiece 60, the springs 62 spring-urge the T 42 in the direction of the stop 72.

A post 74 is provided on the top face of slide 48 to facilitate the movement of the slide 48 in respect to the limbs 46 and 46 of T 42.

A photoelectric cell control 76, of conventional construction, and a light source 78 of conventional construction are provided on opposed upright walls of the chute 38 in aligned disposition.

The top 66 of chute 38 is provided with an opening 80 of approximately the same width as the distance intermediate the limbs 46 and 46 of T 42. The opening 80 is aligned with the tracks 70, so that on the movement of the T 42 within the tracks 70, the opening formed between the end faces 56 and 58 of the T 42 will pass thereover. It is seen that the cylinder 22, chute 38 and cylinder 14 are in communication with each other and hereinafter may be referred to as a duct. However, as will be noted from FIGURES 5 and 6, the opening 80 in the top 66 of chute 38 is offset from the pigment hopper 20 by a distance appreciably greater than the inside diameter of the pigment hopper 20. Accordingly, material cannot pass from the pigment hopper 20 to the opening 80 without the T 42 being moved.

A mixing unit designated generally as 82 is provided at the bottom portion of chute 38. The mixing unit includes the paddles 84 of a type suitable for the dry blending of powders. The paddles 84 are carried on the shaft 86 which extends through opposed walls in the bottom end of the chute 38. The shaft 86 is provided with a sprocket 88 which is driven by the chain 90 which in turn is driven by the sprocket 92 of drive motor 94.

As above-indicated, the chute 38 discharges into the heating cylinder 14.

The operation of the apparatus of the present invention is as follows:

Monomer (and by monomer as used herein is meant the raw plastic charge, such as raw polystyrene, or plastic monomer in the case of material to be polymerized, that is to be processed in the machine of the present invention) is charged to the machine 10 from the hopper 18. The pigment which is to be blended with the monomer from the hopper 18 is charged to the machine 10 from the pigment hopper 20.

The relative ratio of pigment to monomer is regulated by adjusting the opening intermediate the end faces 56 and 58 by tightening the thumbscrew 50 on the slide 48 at the desired setting of the indicia 54. The larger the spacing between the end spaces 56 and 58, the greater the amount of pigment that will be charged to the monomer from hopper 18.

The monomer from hopper 18 is delivered to the chute 38 through the feeding cylinder 22 by the stroke of the piston 24. With the movement of the piston 24 towards the chute 38, the offsets 34 approach the head 44 of T 42 and then engage it thereby moving the T 42 away from the hopper 18. The T 42 is urged towards the hopper 18 by the springs 62 so that the head 44 engages the stop 72.

The movement of the T 42 away from the hopper 18 results in the movement of the opening between the end faces 56 and 58 away from the hopper 20 and to the opening 80. This effects the transmission of the amount of powder carried in the chamber defined by the end faces 56 and 58, the underside of flange foot 64, and the top surface of chute 38 from the hopper 20 to the opening 80, from which opening 80 such powder enters the chute 38. The mixture of pigment and monomer is blended in the mixing unit 82 in the chute 38 by engagement with the paddles 84 which are rotated by the drive motor 94. All of the powder falling through the chute 38 must engage the paddles 84 before passing from the chute 38 to the heating cylinder 14. In this manner blending of the powders to secure a suitably mixed charge of monomer and pigment is achieved. Further blending of the pigment and monomer powders and further mixing is of course encountered within the heating cylinder 14.

Where there is a malfunction, as for example when the pigment hopper 20 is empty, the photoelectric cell control 76, which is set to detect a blend of pigment and monomer and not merely just monomer, will trip off the entire machine 10. In addition, if desired, an audible alarm may be sounded, so that the operator of the machine will know that it is no longer in operation.

If desired, the photoelectric cell control unit 76 may be adjusted to serve as a quality control scanner. Thus, scanning may be made by this unit to determine if an adequate amount, or if too much, pigment is added, in which case the photoelectric cell control unit may signal the operator.

The present invention eliminates the need for pigment blending in advance of processing. Moreover, notwithstanding repeated changes in the ratio of pigment to raw plastic, the machine may be operated almost continuously. Thus, the problems of contamination in the pigment hopper and in the monomer hopper will be absent, since at all times these hoppers will be charging the same materials rather than varying blends.

The present invention may be embodied in other specific forms without departing from the spirit or essential attributes thereof and, accordingly, reference should be made to the appended claims, rather than to the foregoing specification as indicating the scope of the invention.

We claim:

1. Apparatus comprising a chute, a top wall of said chute having an opening, a first and second hopper supported adjacent said chute with said second hopper being directly above said chute, a feeding cylinder in communication with said chute, said first hopper having an opening in communication with said feeding cylinder, a piston in said feeding cylinder for advancing powder in said feeding cylinder to said chute, a piston rod on said piston, at least one offset arm connected with said piston rod and extending substantially parallel to said feeding cylinder toward said second hopper, a T reciprocally mounted below said second hopper, said T having a head for contact with said offset arm, the head of said T being in line with and spaced from said arm, said T having a chamber partially defined by a selectively movable slide on said T, said chamber being successively positioned in communication with said second hopper and the first-mentioned opening in response to reciprocation of said T, whereby accurately controlled amounts of powder from said first and second hoppers are introduced into said chute.

2. Apparatus in accordance with claim 1 including a resilient spring means biasing said T toward said first hopper, said chamber being in communication with said second hopper at the end of the return stroke of said piston and in communication with said opening at the end of the forward stroke of said piston.

3. Apparatus in accordance with claim 2 wherein said selectively movable slide has tongues slidably mounted within grooves on opposite sides of said T, a screw means on said T for selectively securing said slide relative to said T.

4. Powder processing apparatus comprising a duct, a first hopper means for feeding a first powder into said duct, a second hopper means for feeding a second powder into said duct, said first and second hopper means being disposed at spaced points along said duct, agitation means in said duct for blending said first and second powders, said second hopper means communicating with said duct at a point between said first hopper means and said agitation means, movable actuator means partially disposed within a portion of said duct for moving said first powder through a portion of said duct, a selectively variable dispenser apparatus for controlling only the amount of said second powder introduced into said duct, and said duct including a heating cylinder disposed to receive blended powder from said agitator means, and a lost motion connection between said dispenser apparatus and said actuator means so that said dispenser apparatus is responsive to a predetermined amount of movement of said actuator means.

5. Powder processing apparatus comprising an upright chute, a horizontally disposed feeding cylinder having one end in communication with said chute, a first hopper for delivering a monomer into said cylinder, a second hopper disposed for delivering a pigment powder into said chute, a reciprocably disposed piston within said cylinder for advancing powder from said cylinder into said chute, an agitator means in said chute for blending said pigment powder and monomer, a heating cylinder for receiving blended powder from said agitator means, a selectively variable dispenser apparatus for controlling only the amount of said pigment being introduced into said chute, and a lost motion connecting means between said piston and said dispenser apparatus, whereby the amount of said pigment powder and the regularity with which it is introduced into said chute may be controlled in response to the movement of said piston.

References Cited in the file of this patent
UNITED STATES PATENTS

| | | |
|---|---|---|
| 312,689 | Williams | Feb. 24, 1885 |
| 780,680 | Peterson et al. | Jan. 24, 1905 |
| 942,051 | Baxter | Dec. 7, 1909 |
| 1,286,881 | Gray | Dec. 3, 1918 |
| 1,705,057 | Brandus | Mar. 12, 1929 |
| 2,919,726 | Zimmermann et al. | Jan. 5, 1960 |
| 2,934,869 | Engleson et al. | May 3, 1960 |